United States Patent [19]
Birchall

[11] 3,952,234
[45] Apr. 20, 1976

[54] PRESSURE TRANSDUCERS

[76] Inventor: Donald Jack Birchall, c/o D. J. Birchall Limited, Chiswick Ave. Industrial Estate, Mildenhall, Suffolk, England

[22] Filed: Dec. 2, 1974

[21] Appl. No.: 528,863

[30] Foreign Application Priority Data
Dec. 31, 1973 United Kingdom............... 60307/73

[52] U.S. Cl.............................. 317/246; 73/398 C; 317/248
[51] Int. Cl.².......................................... H01G 7/00
[58] Field of Search........... 317/246, 247, 248, 242; 73/398 C

[56] References Cited
UNITED STATES PATENTS

| | | | |
|---|---|---|---|
| 2,367,866 | 1/1945 | Humphreys | 73/398 C |
| 2,916,279 | 12/1959 | Stanton | 317/246 X |
| 3,710,209 | 1/1973 | Webb | 317/246 |
| 3,858,097 | 12/1974 | Poyle | 317/246 |

FOREIGN PATENTS OR APPLICATIONS

| | | | |
|---|---|---|---|
| 132,251 | 7/1951 | Sweden | 317/246 |
| 2,021,479 | 5/1970 | Germany | 317/246 |
| 562,043 | 10/1932 | Germany | 317/242 |

*Primary Examiner*—Elliot A. Goldberg
*Attorney, Agent, or Firm*—Wenderoth, Lind & Ponack

[57] ABSTRACT

The transducer comprises a diaphragm to which the pressure to be measured or monitored is applied to cause deflection. An electrode is formed on one surface of the diaphragm and this electrode forms a differential capacitor in conjunction with a further pair of electrodes mounted on a fixed support plate adjacent the diaphragm. Deflection of the diaphragm causes imbalance of the capacitor to a degree dependent on the deflection.

6 Claims, 4 Drawing Figures

PRESSURE TRANSDUCERS

The present invention relates to pressure transducers of the type in which pressure applied to a diaphragm is converted into a differential charge signal which is then amplified.

Such transducers are commonly made up in the form of a differential capacitor, the plates of which are arranged to move relative to one another upon application of the pressure to be measured or monitored. An AC signal is applied to the capacitor, and the charge held by the two halves of the differential capacitor is amplified using a charge amplifier. These transducers have application in the gas turbine and nuclear fields for direct measuring and monitoring of pressure transients, turbulence, etc.

According to the invention there is provided a pressure transducer comprising a diaphragm for deflection by the pressure being measured or monitored, said diaphragm having a planar electrode formed on one surface thereof, and a support plate of insulating material facing said one surface and spaced therefrom, said plate carrying on its surface facing the diaphragm a pair of mutually isolated planar electrodes, the arrangement being such that the three electrodes together constitute a differential capacitor.

For optimum sensitivity all three electrodes are circular and are mutually coaxial. Deflection of the diaphragm due to applied pressure results in a greater change in capacitance between the inner electrode of said pair and the diaphragm electrode than that between the outer electrode of said pair and the diaphragm electrode. This is due to the shape which the diaphragm takes up as it deflects which will be described in greater detail hereinafter.

The electrode formed on the diaphragm is connected, in use, to an oscillator and the electrodes on the support plate are connected, in use, to respective differential inputs of a charge amplifier. In order to preserve the balance of the system, the two support plate electrodes preferably form, in the undeflected position of the diaphragm, equal capacitances with the diaphragm electrode. If this is the case, the charge held by the two halves of the differential capacitor will be equal when the diaphragm is in the rest position, and the differential charge amplifier will have a zero output.

In order to achieve equality of capacitance between the two halves of the differential capacitor, the support plate electrodes may be formed as a pair of equal coaxial annular areas, the dimensions of the diaphragm electrode being such as to cover both of said areas. Alternatively, the inner support plate electrode may be formed as a disc, with the outer electrode formed as a concentric annulus of equal area.

In certain applications, the diaphragm itself may act as the diaphragm electrode. However, for most applications it is envisaged that screening problems will dictate that the diaphragm electrode be insulated from the diaphragm itself. This may be achieved by providing that surface of the diaphragm which is to be formed with the electrode with a coating of ceramic insulating material, for example alumina. The alumina may be spray deposited onto the diaphragm. The electrode is then formed onto the ceramic coating, for example by screen printing or electro-deposition. The electrode material may be silver or gold.

The support plate may take the form of a ceramic disc onto which the electrodes are formed, for example by screen printing or electro-deposition. As above, the electrode material may be silver or gold.

In order that the invention may be better understood, an embodiment thereof will now be described by way of example only and with reference to the accompanying drawings in which.

Figure 1:
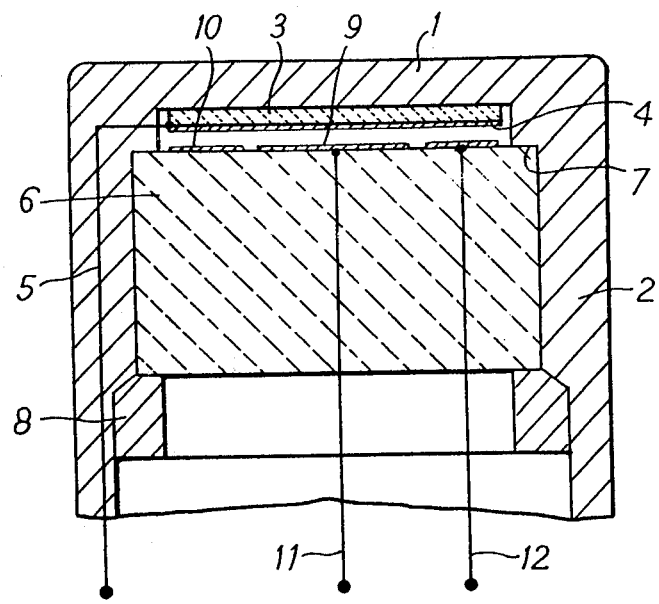
FIG. 1 is a cross-sectional side view of a pressure transducer in accordance with the invention.
Figure 2:
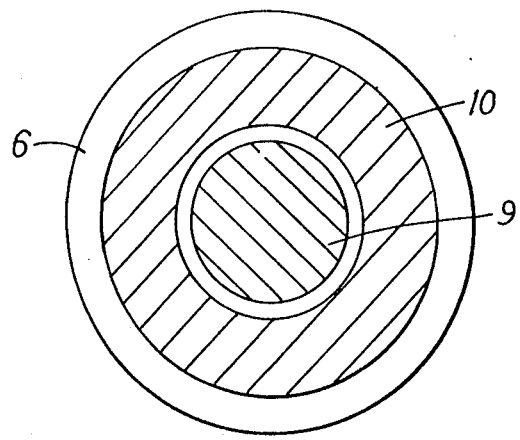
FIG. 2 is a plan view of the electrode arrangement on the support plate of the transducer of FIG. 1.

Referring to the drawings, the pressure transducer comprises a diaphragm 1, for example of stainless steel or a creep resisting nimonic alloy, which is joined to a case 2, for example by welding. The under surface of diaphragm 1 is spray deposited with a thin circular film 3 of ceramic material, for example alumina. The film 3 is metallised to form a disc-shaped electrode 4 of silver or gold. The electrode 3 is connected to the exterior of the case by means of a wire 5. Mounted adjacent to, but spaced from, the under surface of diaphragm 1 is a support plate in the form of a disc 6 of insulating material, for example a ceramic material. The disc is securely held in place by virtue of an annular shoulder 7 and a packing ring 8. The upper surface of disc 6 is provided with a pair of mutually electrically isolated electrodes 9 and 10 which are arranged as shown in FIG. 2. The electrodes 9 and 10 are arranged to have equal areas. Lead out wires 11 and 12 respectively are provided for the electrodes 9 and 10. The electrodes 4, 9 and 10 together constitute a differential capacitor.

Figure 3:
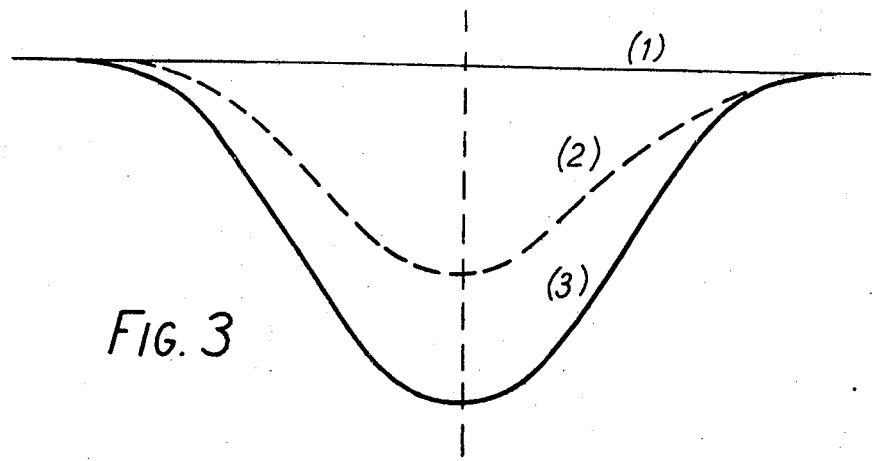
FIG. 3 is a diagram showing the deflection of the diaphragm under varying pressures.

In operation, the outer surface of diaphragm 1 is subjected to the pressure being monitored or measured. FIG. 3 shows the shape which diaphragm 1 takes up for two increasing values of pressure. Line (1) indicates the zero deflection position in which zero pressure is being applied to the diaphragm; lines (2) and (3) illustrate the application of increasing pressure on the diaphragm.

As the pressure is increased, the capacitance change between the diaphragm electrode 4 and electrode 9 will be greater than that between the diaphragm electrode 4 and electrode 10. Thus the balance between the two halves of the differential capacitor is upset.

Figure 4:
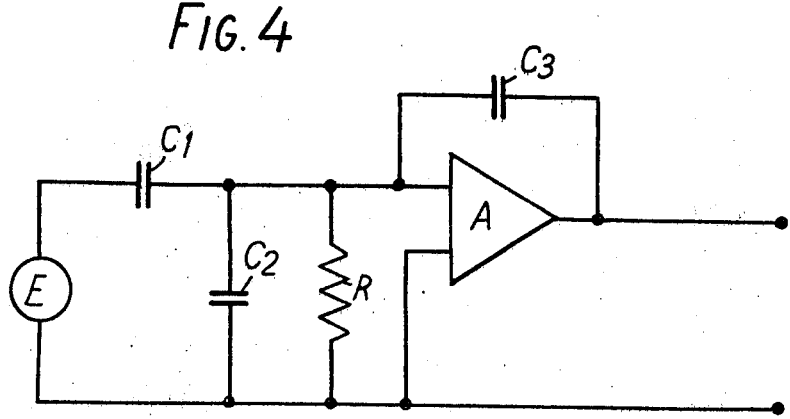
FIG. 4 is a simplified circuit diagram of one channel of a differential charge amplifier for use with the pressure transducer of this invention.

FIG. 4 shows a circuit diagram of a charge amplifier for use with this apparatus. The drawing is much simplified to clearly show the components essential to the present application. In FIG. 4, the capacitance between the diaphragm electrode 4 and one of the electrodes 9 and 10 is represented by capacitor $C_1$. E represents a source of alternating current, for example having a frequency of 20 kHz, which is connected to the diaphragm electrode 4. Capacitor $C_2$ and resistor R represent respectively the shunt capacitance and the leakage resistance of the cable feed from the transducer to a charge amplifier A. The charge amplifier A has a feedback capacitance $C_3$.

It will be understood that each of the electrodes 9 and 10 is connected to a circuit similar to that of FIG. 4. The difference signal between the two inputs is extracted by further circuitry (not shown) which is well known in the art. Thus any imbalance between the two halves of the differential capacitor formed by electrodes 4, 9 and 10 is detected and may be measured. The difference Δc between the changes in capacitance as between the two halves of the differential capacitor as the pressure applied to the diaphragm is varied may be multiplied by the voltage output of source E to give a differential charge signal Δq. It has been found that Δq is a linear function of applied pressure provided that the overall deflection is small compared with the distance between the electrode 4 and the electrodes 9 and 10. This arrangement of the charge amplifier exhibits high noise rejection and is immune from errors caused by the leakage resistance and shunt capacitance of the connecting cable.

The transducer described above is intended to meet a demand for a device which is able to withstand high temperatures, at least 400°C and preferably of the order of 700° to 800°C, and still maintain its accuracy and reliability. It has been found that the electrode arrangement of this device results in a minimal effect of temperature variation on the output signal zero offset, i.e. the degree of imbalance between the two halves of the differential capacitor with zero applied pressure. Any variation to temperature will have an equal effect on both halves of the capacitance and, although altering the total capacitance, will not alter the capacitance difference between the two halves. Hence zero balance is maintained.

I claim:

1. A pressure transducer comprising a metal diaphragm for deflection by the pressure being measured or monitored, a coating of ceramic insulating material on one surface of said diaphragm, said planar electrode on said coating being electrically isolated from said diaphragm by said coating, and a support plate of insulating material facing said one surface and spaced therefrom, said plate carrying on its surface facing the diaphragm a pair of mutually isolated planar electrodes, the three electrodes together constituting a differential capacitor.

2. A pressure transducer as claimed in claim 1 wherein all three electrodes are circular and are mutually coaxial.

3. A pressure transducer as claimed in claim 2 wherein the one electrode on said support plate electrode is a disc and the second electrode is an annulus concentric with said disc, the dimensions of the electrode on said coating being such as to cover both of said electrodes on said support plate.

4. A pressure transducer as claimed in claim 1 wherein the size and positions of the electrodes is such that the capacitances between the electrode on the diaphragm and the respective two electrodes on the support plate, in the undeflected position of the diaphragm, are equal.

5. A pressure transducer as claimed in claim 1 wherein said ceramic insulating material is alumina which is spray deposited onto that surface of the diaphragm on which the electrode is positioned, and wherein the electrode is formed onto the ceramic coating by screen printing.

6. A pressure transducer as claimed in claim 1 wherein said ceramic insulating material is alumina which is spray deposited onto that surface of the diaphragm on which the electrode is positioned, and wherein the electrode is formed onto the ceramic coating by electro-deposition.

* * * * *